Figure 4:
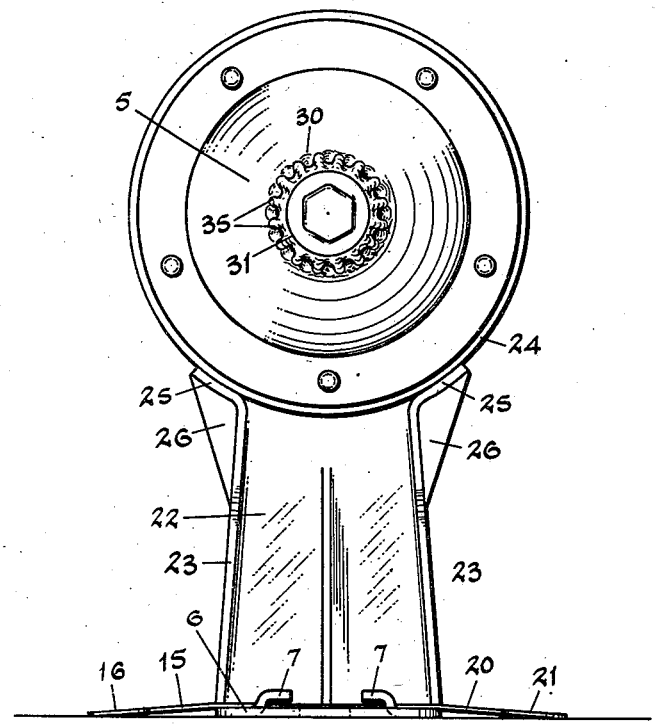

April 7, 1942.  P. F. PARROTT  2,279,127
VEHICLE ELEVATING MEANS
Filed Sept. 20, 1940  2 Sheets-Sheet 1
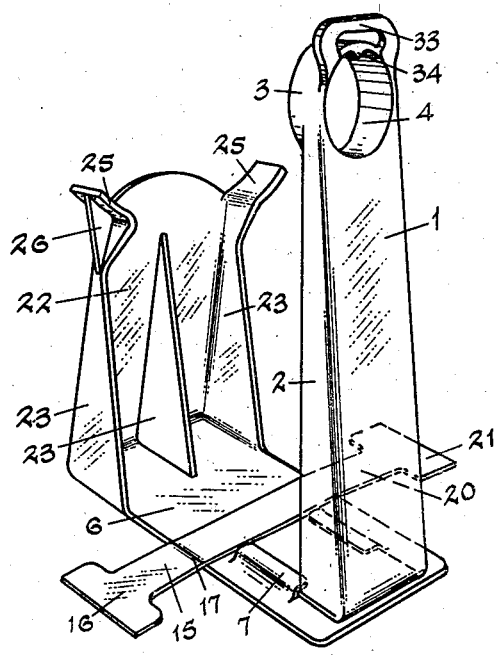
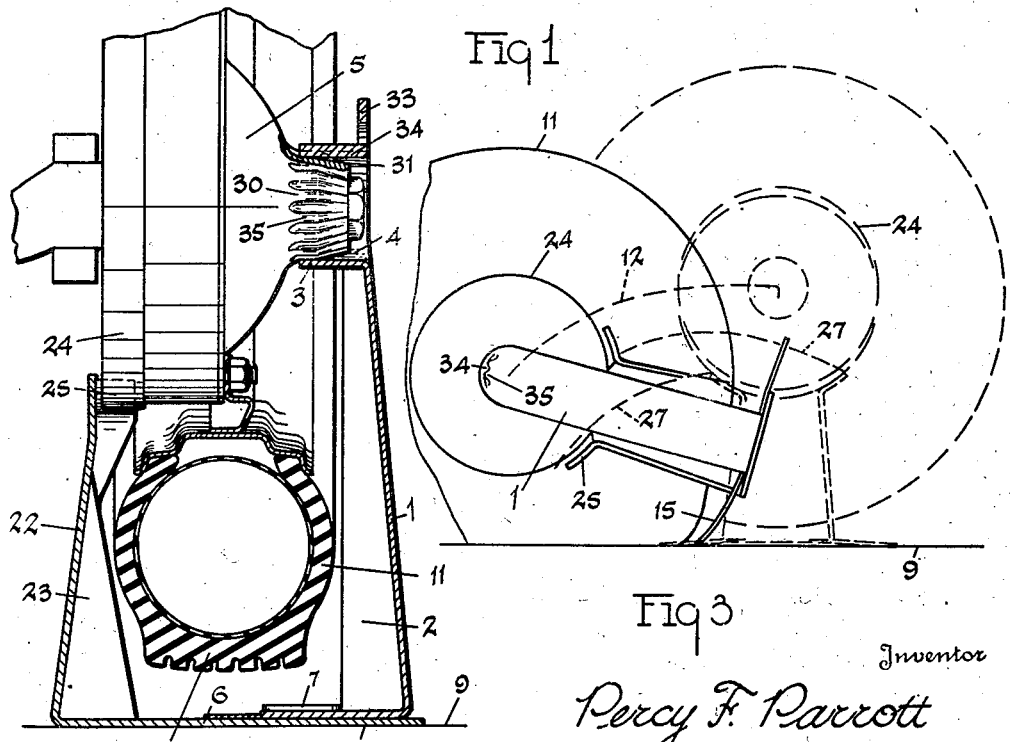
Inventor
Percy F. Parrott
By Faust F. Crampton
Attorney April 7, 1942. P. F. PARROTT 2,279,127
VEHICLE ELEVATING MEANS
Filed Sept. 20, 1940 2 Sheets-Sheet 2

Inventor
Percy F. Parrott
By Faust F. Crampton
Attorney

Patented Apr. 7, 1942

2,279,127

UNITED STATES PATENT OFFICE 2,279,127

VEHICLE ELEVATING MEANS

Percy F. Parrott, Toledo, Ohio, assignor of one-half to Loretta Parrott and one-half to Marjorie Jeanne Parrott Application September 20, 1940, Serial No. 357,599

10 Claims. (Cl. 254—94)

My invention, generally, relates to a means for elevating a vehicle, or a part thereof, from its normal relative position of road bearing to a position, above the road, at which repairs or replacements may be effected and access may be had to the underside of the vehicle. The invention, particularly, relates to a means for elevating a vehicle, or a portion thereof, said means being adapted to engage a vehicle part and the road and to cause the vehicle to vault from a road bearing position to an elevated position, when the vehicle is moved over the road in response to a moving force, such as that as may be applied to the vehicle by its own motive power unit. The invention, therefore, provides a means, whereby the vehicle may be elevated under and by application of its motive power, such elevation, thus, being accomplished with considerable ease and speed.

The invention has for an object to provide a movable strut element having associated therewith a means for engaging a vehicle part and a means for engaging the road supporting said vehicle and spaced from said first-named means a distance greater than the vertical distance between said engageable vehicle part and the road, when the vehicle is in its normal bearing relation on said road. In use, the means for engaging the vehicle part is adapted to be, first, located in engaging relation with the engageable vehicle part and the said element is adapted to be, then, tilted relative to a true vertical line, locating the road engaging means in contact with the road surface. Thus, when the vehicle is moved relative to the road, the element pivots on the point or points on the road surface engaged by its road engaging means and guides the vehicle part, engaged by the vehicle part engaging means thereof, arcuately upward to elevations depending on the distance between the two named means of the element and on the extent to which the element is pivotally moved. It may be said, assuming the vehicle is moved under its own power, that the invention provides means, whereby the vehicle vaults to its elevated positon in much the same manner as a pole vaulter elevates himself, when attempting to clear a bar.

The invention, also, has for an object to provide, on said element, means for sustaining the element in a desired vertical or near vertical position, to which it may have pivotally moved and, in doing so, elevated and guided the vehicle part engaged by said vehicle engaging means thereof. Said element sustaining means, in operation, thus, prevents further undesired pivotal movement of the element, after a desired elevation of the vehicle or a part thereof, and assures that the elevated vehicle part will be retained in an elevated positon, during the period while repairs or replacement of the elevated vehicle is effected or access to the underside thereof is had.

Another and more particular object of my invention is to provide, in conjunction with and cooperative to said element, a pillow part having means for engaging another vehicle part and for sustaining it in an elevated position. By, thus, providing said pillow part, the element, if found to impede the desired access to the vehicle parts to be repaired, may be disengaged, after elevation, the pillow part thereafter operating to retain the elevated vehicle.

A still further and particular object of the invention is to provide a positive interengaging member in said vehicle part engaging means which is adapted to mesh with a corresponding positive interengaging member, either formed on the engageable vehicle part or provided by an adapter affixed to said vehicle part. In that connection, my invention proposes an adapter having a positive interengaging member for use in conjunction with the element of my invention. The provision of said interengaging member, either formed on the vehicle part or provided by the adapter of my invention, will be found of particular desirability where the vehicle part engaged is operatively connected to the driving axle of the vehicle.

A still further and more particular object of the invention is to provide a vehicle elevating means of great simplicity and little cost, notwithstanding the ease and rapidity with which a vehicle may be elevated thereby. Embodiments of the invention, also, have means for readily adapting said embodiments for use on military and commercial, as well as pleasure, vehicles of various designs and sizes.

The invention consists in other features and advantages which will appear from the following description and upon examination of the drawings. Structures containing the invention may partake of different forms and still embody the invention. To illustrate a practical application of the invention, I have selected a vehicle elevating means as an example of the various structures and details thereof that contain the invention and shall describe the selected structure hereinafter, it being understood that variations may be made without departing from the spirit of the invention. The particular structure selected is shown in the accompanying drawings and described hereinafter.

Fig. 1 of the accompanying drawings illustrates an embodiment of my invention in one of the best forms now known to me and particularly adapted for elevating an automobile vehicle or part thereof. Fig. 2 illustrates a view of a vertical section of the device shown in Fig. 1 and shown in engagement with a vehicle part, such as the axle of an automobile. Fig. 3 illustrates, diagrammatically, the operation of the embodiment shown in Fig. 1 to elevate a vehicle part to the position shown in Fig. 2. Fig. 4 illustrates a view showing the vehicle being supported by the pillow part of the construction shown in Fig. 1.

The embodiment of my invention, selected for purposes of illustration and shown in the accompanying drawings, is, as above stated, primarily, designed for elevating automobile vehicles or a part, such as an axle thereof, to enable changing of the pneumatic tires thereof or for securing access to the underside thereof. The movable strut element of said embodiment is incorporated in the bar 1, shown in said drawings. The bar 1 may be formed from metal and be suitably reinforced, for rigidity, by integral flanges 2. The bar 1 has, associated therewith and connected thereto, a means for engaging a vehicle part and a means for engaging the vehicle supporting road, spaced from the first-named means a distance greater than the vertical distance between said engageable vehicle part and said vehicle supporting road, when the vehicle is in its normal bearing relation on said road.

In the particular form shown in the drawings, the means for engaging a vehicle part is embodied in a bearing collar 3, which is formed integral with said bar 1. The bearing collar 3 has an inner surface 4 adapted to receive and bear a vehicle part, such as the end of the vehicle axle or its housing 5. The means for engaging the vehicle supporting road is embodied in the base plate 6, to which the bar 1 may be removably connected, as shown by ways 7, for reasons to be hereinafter mentioned. The inner surface 4 of the collar 3 is spaced, from the under surface 8 of the base plate 6, a distance greater than the vertical distance between the axle or the engageable portion of its housing 5 and the vehicle supporting road, the plane of which is indicated by the line 9 in Figs. 2 and 3. The spacing between said inner surface 4 and the under surface 8 is, also, greater than the vertical distance between said housing 5 and the tread 10 of the vehicle tire 11, when the tire is fully inflated and in normal bearing relation on said road.

Thus, assuming that the elevation of the vehicle becomes requisite, say for example, due to the puncture of the tire 11, the collar 3 is located in engagement with the axle or housing 5 and the bar 1 is, then, tilted to permit placing the base plate 6 in engagement with the road. As the vehicle is moved, say by its own power unit, the edge of the base plate on under surface 8 will bite into the road surface, causing the bar 1 to pivot about the points of engagement of said plate edge with said road surface. In thus pivoting, the bar 1 will guide the engaged vehicle part through an elevating arc, illustrated by the dotted line 12 shown in Fig. 3, to ultimately locate the vehicle in the elevated position, shown in Fig. 2.

The means for sustaining the movable strut bar 1 in a vertical or near vertical position, to which it has been moved in elevating the vehicle part, may be embodied in a structure, which is connected to the strut or to a means connected or connectable thereto, for example, the road engaging means utilized in elevating the vehicle. In the form shown in the drawings, said means for sustaining the strut bar 1 in a vertical or near vertical position, so as to enable repair and replacement of a vehicle part or access to the underside of the vehicle while thus elevated, is combined with the aforesaid means for engaging the road and is embodied in the base plate 6. As will be observed from the drawings, particularly Fig. 1 thereof, the base plate 6 and the under surface 8 thereof extend over a considerable area on either side of a point on a line describing the longitudinal axis of said bar 1. When the bar 1 is located in its vertical position, the under surface 8 will engage the road surface at a plurality of spaced points and will resist, within certain limitations, such moments as are exerted by the weight of the vehicle on the bar 1. Thus, the vehicle part 5 will be retained in its elevated position for as long a period as is required to effect the desired repairs, replacement, or access to the underside.

In order to aid the heretofore described action of the means for engaging the road and the means for sustaining the movable strut in a near upright position, my invention provides a unit which supplements the action of said several means. Said unit has a resilient leg and a foot having a material road engaging surface adapted to engage the road at points considerably spaced from the perimeter of the plate 6. The foot of said unit is adapted, when the vehicle part engaging means is placed in engagement with the engageable vehicle part, preliminary to elevation, to engage the road surface at points more nearly below the vehicle than the plate 6 can be located. Thus, as the vehicle is moved over the road surface, the foot will be pressed against the road surface with an increasing pressure and, through the leg, will tend to draw the plate 6 and its edge into contact with the road surface to initiate the elevating pivotation of the strut element. The leg of said unit is, also, adapted to resiliently urge said foot in engagement with the road surface when the under surface 8 of the plate 6 is, also, in engagement with the surface of the road to resist gravitational moments exerted on said strut by the weight of the vehicle.

In the particular form shown in the accompanying drawings, the said unit is illustrated by the resilient leg 15 and foot 16. The leg 15 may be connected to the plate 6 in any suitable manner. The leg 15 is, preferably, bent, as shown at 17, to locate portions of the under surface of the foot 16 in a plane common to that of the under surface 8 of the plate 6. Preferably, in order to provide for universal operation, either from the right or left side of the vehicle, the leg 15 has an integral and correspondingly formed and operating leg 20 and foot 21. The leg 20 extends in the opposite direction and beyond the opposite edge of the plate 6 from that of the leg 15.

In operation, as diagrammatically illustrated in Fig. 3 of the drawings, the foot 16 engages the road surface, and, due to the developed congestion between the road and bar 1, as the vehicle is moved over the road surface, the leg 15 is distorted, causing increasing friction and drag to be developed between the foot 16 and the road surface. The distortion of the leg 15, coupled with the frictional drag of the foot 16, urges the plate 6 into a position where its edge engages the road surface to initiate the elevation of the vehicle, as heretofore described.

Should the elevating position of the bar 1 prove to be a barrier to the efficient repair and replacement contemplated or deny the desired access to the vehicle parts, my invention provides for the disengagement of the vehicle part engaging means of said bar from the engaged vehicle part, permitting the removal of said bar from connection with the plate 6 and the laying of said bar aside. It is for this reason that the bar is, preferably, removably connected to its sustaining means. In this connection, the invention, further, provides a pillow part connected to and sustained by the aforesaid sustaining means and having means for engaging another vehicle part to thus sustain the elevated vehicle, notwithstanding the disengagement of the bar and its means. The pillow part, in the form shown in the drawings, is embodied in an upright 22 having suitable reinforcing webs 23 and connected to the base plate 6 at points spaced from the connection of the bar 1 thereto. The upright 22 has means for engaging a vehicle part, such as the vehicle brake drum 24, incorporated in the spaced rests 25. The rests 25 may be formed integral with the upright 22 and be suitably braced by webs 26. The rests 25 are spaced from the under surface 8 of the base plate 6 a greater distance than the vertical distance between the points on the drum, adapted to be engaged by said rests, and the road surface when the vehicle is in its normal road bearing position.

In order to prevent scoring of the brake drum, by the rests 25, during elevation of the vehicle, as heretofore described, the upright 22 and rests 25 are located, relative to the plate 6, so as to clear said drum when the bar 1 pivots to elevate the vehicle. This may be accomplished by making the upright 22 of such length that the arcs, indicated by the dotted lines 27, shown in Fig. 3 of the drawings and described by the rests 25, during the pivotal movement of the bar 1 and connected plate 6, pass under the drum 24. Thus, when the bar 1 reaches a position at which the plate 6 resists further pivotal movement, the rests 25 are located just below the drum 24. When, however, the bar 1 is moved to disengage its collar 3 from the housing 5, the drum 24 comes to bear on the rests 25. The bar 1 then may be disconnected from the plate 6, by moving the bar laterally in the ways 7 and laying it aside.

The collar 3 and the housing 5 may have cooperatively related cam surfaces to facilitate the disengagement of the collar 3 from the housing 5 and delivery of the drum 24 to a bearing position on the rests. In the form selected, the housing 5 has an inner cylindrical collar portion 30 and an adjacent outer truncated conical collar portion 31 surrounding the vehicle axle. The inner cylindrical collar portion and its outer conical portion not only serve to house the end of the vehicle axle, but, also, provide areas for engagement and operation of the collar 3. The said portions may be formed as integral parts of the axle housing 5, or the conventional housing be adapted by substituting an adapter of the same general conformation of the conventional housing part, but having said portions provided thereon. The cylindrical portion 30 is adapted to be received within the collar 3 in bearing relation to the surface 4 thereof, in preparation for and during elevation. After elevation has been completed, the bar 1 may be rocked on the base plate, by the handle 33, and moved within the latitude permitted by the ways 7 and the yieldability of the bar 1, in directions substantially coaxial with and away from the cylindrical portion 30 to disengage the surface 4 therefrom. As the surface 4 disengages the cylindrical portion 30, it engages the adjacent conical portion 31. Due to the inclined cam-like form of the portion 31, the vehicle is permitted to gradually descend, until, ultimately, the drum 24 is located on the rests 25. If desired, the bar 1 may, then, be disengaged from the plate 6 and laid aside.

Preferably, the collar 3, particularly the inner surface 4 thereof, and the cylindrical portion 30 of the housing 5 are provided with a positive intermeshing means. Said means may be embodied, on the collar 3, in the tooth 34 formed on the surface 4 and, likewise, embodied, on the cylindrical portion 30, in the plurality of corresponding teeth 35. The provision of the teeth 34 and 35 enables the bar to be keyed to the axle housing and is especially important when the wheel, through which driving traction of the vehicle with the road is normally obtained, is to be elevated. By the interengagement of teeth, the torque produced by the driving axle will be exerted through the bar 1 to cause the essential pivoting thereof and resultant elevation.

When the vehicle repairs have been completed, the vehicle may be forcibly dislodged from its supported position by moving the vehicle over the road surface. Such movement will overcome the resistance exerted by the base plate 6 and permit it to tip with its associated means, disengaging the vehicle parts.

Those skilled in the art will appreciate that other arrangements and forms of the parts than those particularly shown and described herein may be utilized, without departing from the spirit of my invention, as set forth in the claims hereto appended.

I claim:

1. A vehicle-elevating device comprising a movable strut; a base plate; means for removably connecting said strut to said base plate; an upright mounted on said base plate, in spaced relation to said strut connecting means; means mounted on said upright for engaging a vehicle part and spaced a greater distance from said base plate than the vertical distance between the engageable vehicle part and a vehicle-supporting road, when the vehicle is in a normal bearing relation on the road; a member, having a surface for engaging a second vehicle part, mounted on said strut and spaced a greater distance from said base plate than the distance between the second-named means and the base plate; the strut adapted to be tilted relative to the road surface to permit engagement of the member surface and second vehicle part and of the base plate with the road and, upon movement of the vehicle over the road, adapted to pivot about the points of engagement of said base plate and road, guiding the vehicle parts through elevating arcs over the road; said member surface having portions, cooperating with the surface of the second vehicle part surface, for directing the first vehicle part downwardly into engagement with the second-hand means, as the member is disengaged from the second vehicle part.

2. In combination with a powered vehicle having a rotatable part operatively connected to the vehicle drive mechanism, the part having a plurality of teeth, a vehicle-elevating device comprising a strut element; a vehicle road-engaging member mounted on and proximate to one end of said strut element; a second member for engaging said part and having a tooth adapted to mesh with the teeth of said rotatable part, said second member mounted on the strut element and disposed a greater distance from said road-engaging member than the vertical distance between said rotatable part and the road, when the vehicle is in a normal bearing relation on the road; the strut element adapted to be tilted relative to the road to permit engagement of the road-engaging member and road and meshing of the second member and part teeth and, upon rotation of the vehicle part, adapted to be pivoted about the points of engagement of said road-engaging member and the road, causing the vehicle part to move arcuately upward over the road.

3. In combination with a vehicle having a rotatable part; a vehicle-elevating device comprising a strut element having a vehicle-engaging member; each of said rotatable part and vehicle-engaging member having intermeshing means adapted to intermesh when located in an engagement; a road-engaging member mounted on the strut element and disposed a greater distance from said vehicle-engaging member than the vertical distance between said rotatable part and the road, when the vehicle is in a normal bearing relationship on the road; the strut element adapted to be tilted relative to the road to permit engagement of the road-engaging member and the road and meshing of the vehicle-supporting member and the rotatable part and, upon rotation of the vehicle part, adapted to be pivoted about the points of engagement of said road-engaging member and the road, causing the vehicle part to move arcuately upward over the road.

4. In combination with a vehicle having a rotatable part, a vehicle-elevating device comprising a strut element having a vehicle-engaging member; positive interlocking means for interlocking said vehicle part and said vehicle-engaging member when the vehicle-engaging member has been located in engagement with said vehicle part; a road-engaging member mounted on the strut element and disposed a greater distance from said vehicle engaging member than the vertical distance between said rotatable part and the road, when the vehicle is in a normal bearing relationship on the road; the strut element adapted to be tilted relative to the road to permit engagement of the road-engaging member and the road and interlocking of the vehicle-supporting member and the rotatable part and, upon rotation of the vehicle part, adapted to be pivoted about the points of engagement of said road-engaging member and the road, causing the vehicle part to move arcuately upward over the road.

5. A vehicle-elevating device including means for engaging a vehicle part; a strut element connected to and supporting said means; means for engaging a vehicle-supporting surface area connected to said strut element and disposed a greater distance from the first-named means than the vertical distance between the engageable vehicle part and the vehicle-supporting surface, when the vehicle is in normal bearing relation to said surface; said strut element adapted to be positioned angularly relative to said vehicle-supporting surface to permit engagement of the first-named means with the engageable vehicle part and the second-named means with the vehicle-supporting surface area; and a member independent of said second named means, operatively connected to said strut element for engaging the vehicle-supporting surface at points in an area intermediate the area of engagement of said second-named means with said vehicle-supporting surface and points on said surface in vertical alignment with said engaged vehicle part; said last-named member adapted, upon movement of the vehicle over said supporting surface, to resist lateral movement of the strut and said second-named means and to initiate pivotal movement of said strut about the points of engagement with said first surface area, whereby the engaged vehicle part may be guided through an arcuate and upward path relative to said surface.

6. A vehicle-elevating device including means for engaging a vehicle part; a strut element connected to and supporting said means; means for engaging points in an area of a vehicle road connected to said strut element and disposed a greater distance from the first-named means than the vertical distance between the engageable part and the road, when the vehicle is in normal bearing relation to said road; said strut element adapted to be tilted relative to the road to permit engagement of the first-named means with the engageable vehicle part and the second-named means with the road area and, upon movement of the vehicle over said road, adapted to pivot about the point of engagement of said second-named means and said road area to a substantially vertical position, at which the first and second-named means are substantially vertically aligned with the strut element and the engaged vehicle part is supported thereby above the road area; a member for engaging the road, independent of said road engaging means; and means for supporting said member in spaced relation to said road engaging means and in position to engage the road at points in an area spaced from the first-named road area to resist further pivotal movement of the strut element from its substantially vertical position aforesaid.

7. A vehicle elevating device including means for engaging the vehicle supporting road; a pair of members connected to and extending from said means and disposed in spaced relation to each other; means for engaging a vehicle part connected to each of said members and disposed a greater distance from the first named means than the vertical distance between the vehicle part engaged thereby and the road, when the vehicle is in normal bearing relation on said road; said members adapted to be tilted relative to the road to permit engagement of a vehicle part by the second-named means of one of said members and engagement of the first-named means with the road and, upon movement of the vehicle over the road, adapted to pivot about the points of engagement of said road and first-named means, guiding the vehicle through an upward arcuate path relative to the road and locating the second member and its respective second-named means in substantial vertical alignment with a second vehicle part and in position to receive the same for support thereof.

8. A device for elevating a vehicle having a road bearing wheel, said device including means for engaging the vehicle supporting road; a pair of members connected to and extending from said means in spaced relation; means for engaging a vehicle part connected to each of said members and disposed a greater distance from the first-named means than the vertical distance between the respective vehicle parts engaged thereby and the road, when the vehicle is in normal bearing relation on said road; said members adapted to be tilted relative to the road to permit engagement of a vehicle part by the second-named means of one of said members and engagement of the first-named means with the road and, upon movement of the vehicle over the road, adapted to pivot about the points of engagement of said road and first-named means, guiding the vehicle through an upward arcuate path relative to the road and locating the second member and its respective second-named means in substantial vertical alignment with a second vehicle part and in position to receive the same for support thereof.

9. A device for elevating a vehicle having a road bearing wheel, on one side of which is located a wheel brake drum, said device including means for engaging the vehicle supporting road; a pair of members connected to and extending from said means in a spaced relation to receive said wheel therebetween; means connected to one of said members for engaging a vehicle part disposed on the vehicle and on the same side of the wheel as the wheel brake drum and a second means connected to the other of said members for engaging another vehicle part disposed on the vehicle and on the opposite side of the wheel to the wheel brake drum, each of said last-named means being supported a greater distance from the first-named means than the vertical distance between the respective vehicle parts engaged thereby and the road, when the vehicle is in normal bearing relation on said road; said members adapted to be tilted relative to the road and located on either side of said wheel to permit engagement of a vehicle part by the second-named means of one of said members and engagement of the first-named means with the road and, upon movement of the vehicle over the road, adapted to pivot about the points of engagement of said road and first-named means, guiding the vehicle through an upward arcuate path relative to the road and locating the second member and its respective second-named means in substantial vertical alignment with said other vehicle part and in position to receive the same for support thereof.

10. A vehicle elevating device including means for engaging a vehicle part; a strut element connected to and supporting said means; means, for engaging points in an area of the vehicle supporting road, connected to said strut element and disposed a greater distance from the vehicle engaging means than the vertical distance between the engageable vehicle part and the road, when the vehicle is in normal bearing relation to said road; said strut element adapted to be positioned angularly relative to said road to permit engagement of the vehicle-engaging means with said vehicle part and the road engaging means with the road; a member, independent of said road-engaging means and operatively connected to said strut element for engaging points in a second area of the road spaced from the first named area and intermediate the first named road area and points on said road in vertical alignment with said engaged vehicle part; said last-named member adapted, upon movement of the vehicle over said road, to resist lateral movement of the strut and said road engaging means and to initiate pivotal movement of said strut about the points of engagement with said road, whereby the engaged vehicle part may be guided through an arcuate and upward path relative to said road; a second member, independent of said road engaging means, for likewise engaging points in a third area of the road spaced from the first and second-named road areas; and means for supporting said second member in spaced relation to said road engaging means and in a position to engage the road at points in said third area to resist continued pivotal movement of the strut element upon completion of the upward movement of the vehicle part.

PERCY F. PARROTT.